United States Patent [19]
Weickhardt

[11] 3,782,485
[45] Jan. 1, 1974

[54] WEIGHING BALANCES WITH PARALLELOGRAM SUPPORT FORMED BY TWO PARALLEL GUIDE MEMBERS

[75] Inventor: Ludwig Weickhardt, Bovenden, Germany

[73] Assignee: Sartorius-Werke GmbH, Gottingen, Germany

[22] Filed: July 24, 1972

[21] Appl. No.: 274,802

[30] Foreign Application Priority Data
Aug. 4, 1971  Germany............................ 2138902

[52] U.S. Cl................................. 177/157, 177/255
[51] Int. Cl. ...................... G01g 21/24, G01g 23/02
[58] Field of Search..............177/154–157, 255, 256

[56] References Cited
UNITED STATES PATENTS

| | | | |
|---|---|---|---|
| 2,950,100 | 8/1960 | Rapp................................. | 177/155 |
| 3,026,954 | 3/1962 | Appius............................ | 177/157 X |
| 3,039,549 | 6/1962 | Meier................................ | 177/155 X |

FOREIGN PATENTS OR APPLICATIONS

| | | | |
|---|---|---|---|
| 910,345 | 11/1962 | Great Britain...................... | 177/157 |
| 1,284,299 | 1/1962 | France.............................. | 177/157 |
| 1,242,893 | 6/1967 | Germany ........................... | 177/255 |
| 1,298,128 | 1962 | France............................... | 177/255 |
| 654,619 | 1963 | Italy................................... | 177/255 |

*Primary Examiner*—Richard B. Wilkinson
*Assistant Examiner*—Stanley J. Witkowski
*Attorney*—Herbert L. Lerner et al.

[57] ABSTRACT

A weighing balance includes an unsymmetrical beam, a frame having a bearing surface, a beam-supporting knife edge located on the beam and engaging the bearing surface, a load-supporting knife edge carried by the beam at a spaced distance from the beam-supporting knife edge, a load suspension member supportable by the load-supporting knife edge during a weighing operation, the load suspension member being liftable from the load-supporting knife edge to stop the weighing operation, counterweight means carried by the beam, the beam, in condition when the load suspension member is lifted from the load-supporting knife edge, being tiltable under action of the counterweight to a stop position wherein the beam-supporting knife edge is raised from the bearing surface, combined with the weighing balance are means for arcuately stopping the weighing operation by lifting the load suspension member from the load-supporting knife edge and for arcuately starting the weighing operation by permitting the load suspension member to be supported by the load-supporting knife edge, the arcuate stopping and starting means including a parallelogram support formed by two parallel guide members, lifting means mounted at one end of the guide members and engageable with the load suspension member, the guide members having another end thereof mounted on the frame, each of the guide members having an effective length approximately equal to the distance between the beam-supporting and the load-supporting knife edges, the guide members of the parallelogram support maintaining parallelism with an imaginary line extending between the knife edge in condition when the lifting pins engage the load suspension member and the guide members tilt with the beam.

4 Claims, 4 Drawing Figures

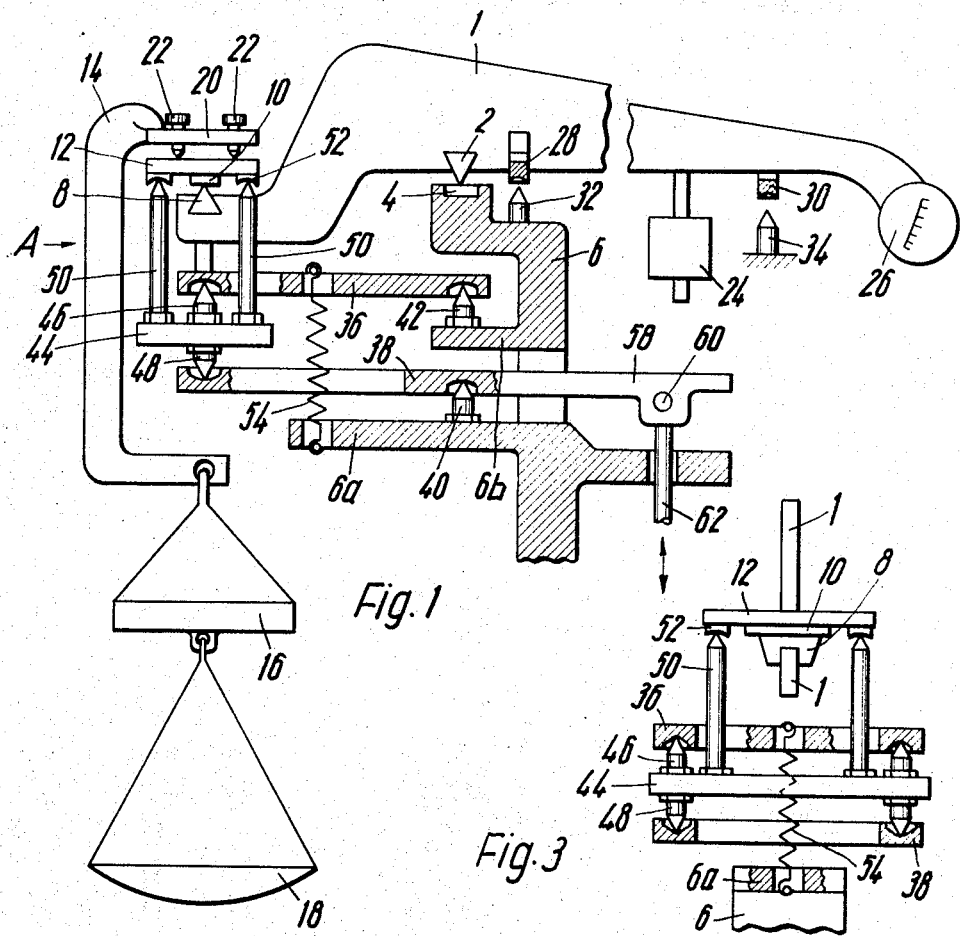
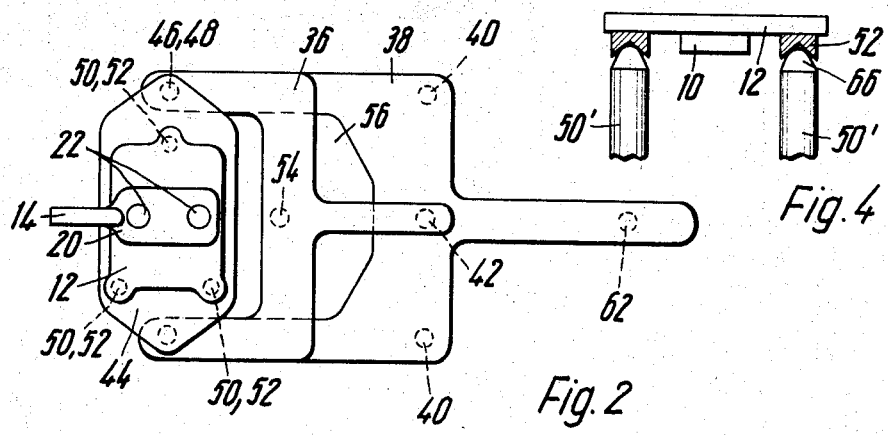

WEIGHING BALANCES WITH PARALLELOGRAM SUPPORT FORMED BY TWO PARALLEL GUIDE MEMBERS

The present invention relates to a weighing balance incorporating an arcuate weighing stopping starting device for the load suspension arrangement, thereof the balance, having an unsymmetrical beam which, on lifting off being raised from the load suspension arrangement, by tilting thereof under the action of a counterweight, attains a rest or stop position in which a beam supporting knife-edge located on the beam is lifted off a bearing surface therefor.

Such a weighing balance incorporating an arcuate weighing stopping device is disclosed in German Pat. Specification No. 1,242,893. By "arcuate weighing stopping device" within the meaning of the present invention, only those wighing stopping devices are meant in which the lifting pins for the load suspension are moved in arcs centered on the knife edge of the load-supporting knife-edge, so that during the lifting off process of the load suspension from the load-suspension knife edge, lateral displacements of the load-supporting knife-edge with respect to a load suspension socket, which engages the load-supporting knife-edge during a weighing, operation are avoided. On the other hand, weighing stopping devices, for example according to German Pat. Specification No.1,193,693, in which lifting pins for the load suspension and for the beam supporting knife-edge are moved in arcs parallel to one another, as, for example, when they fit on a common carrier, are not to be regarded as arcuate weighing stopping devices according to the instant application. In fact, they have the same fundamental deficiency as parallel weighing stopping devices, i.e., those wherein lateral displacement occurs between the load suspension and the load-supporting knife edge as the load suspension is lifted from the load-supporting knife edge. (See for example, Felgentraeger 1932 p.131, last paragraph). In the case of a beam disposed in a very oblique position, the lifting pins cannot, when first engaging a load suspension, meet the movable part of the suspension at the correct point. If, in such a situation, a weighing process or operation is carelessly stopped, the knife-edges and sockets slip towards one another to attain their correct positions. This places contacting surfaces under considerable pressure, which may lead to damage to the knife-edges.

The problem of lateral displacement is in fact overcome by an arcuate weighing stopping device according to German Pat. Specification No. 1,242,893. However, in this case, a further disadvantage is present in that the lifting pins for the load suspension carry out tilting movements during engagement and initial lifting of the load suspension from the load knife-edge and therefore transmit torsional moments to the load suspension. Thus, as the load suspension is lifted clear of or lowered onto the load-supporting knife-edge, the suspension oscillates and one must wait until it comes to rest. This is noticeably disturbing in the case of precision balances and especially in the case of microbalances.

Further, owing to the tilting movements of the suspension lifting pins, no three-point contacts, i.e., three lifting pin arrangements, can be used for the load suspension. Due to the relatively large spacing between two pins in the direction of the beam, very large tilting movements would be transmitted to the load suspension. Moreover, this leads to an overloading of one of the supporting pins of a suspension stirrup forming part of the load suspension.

The present invention relates to an arcuate weighing stopping device of the type mentioned above which is constructed so that a transmission or torsional moment to the load suspension during the commencement and stopping of a weighing operation (i.e., the lifting of the load-supporting knife-edge from the load suspension or the lowering thereof onto the same), is completely avoided.

According to the present invention there is provdied a weighing balance incorporating a weighing stopping and starting device, the balance having an unsymmetrical beam which, during a weighing operation, is mounted on a frame by means of a supporting knife-edge and which, when a load suspension member is lifted from a load supporting knife edge on the beam by the device, moves to a stopped position by tilting movements under the influence of a counterweight. In the stopped position, the supporting knife edge is lifted from its bearing surface, the weighing stopping and starting device comprising a parallelogram support having two parallel guide members, one end of the support carrying lifting pins for engaging the load suspension member, and the other ends of the guide members being mounted on the frame, the effective length of each guide member being approximately equal to the distance between the knife edges, and the parallelogram support being arranged so that the guide members remain parallel to an imaginary line drawn between the knife edges, as the lifting pins engage the load suspension member and guide members pivot with the beam.

Preferably the longitudinal median axes of the guide members and the beam lie in a common plane.

Irrespective of whether a two-point contact or a three-point contact is used, in any case the lifting pins do not carry out tilting movements, so that no torsional moment is transmitted to the load suspension.

The parallelogram support may in principle be located above or below the beam with its longitudinal axis parallel to the longitudinal axis of the beam, and the support may be offset along the longitudinal axis of the beam in either direction with respect to the supporting knife edge or edges. A particularly compact and sturdy version is obtained in a further development of the present invention in that the bearing points of the guide rods are located vertically below the knife-edge lines of both the load beam and support knife-edges on the beam.

In further development of the present invention, when using a two-point contact for the load suspension, additional oscillations may be avoided by providing V-sockets or conical depressions on the load suspension, the lifting pins engaging therein having strongly rounded off peaks. Swinging movements due to the load suspension itself are then suppressed in this way by friction.

The present invention will now be further described by way of example, with reference to the accompanying drawings, in which:

FIG. 1 is a diagrammatic side view, partially in cross-section, of a balance constructed according to the present invention with an unsymmetrical beam, and incorporating a weighing stopping device with a three-point contact for the load suspension.

FIG. 2 is a plan view of the parallelogram support used in the embodiment in FIG. 1.

FIG. 3 shows details of the parallelogram support and lifting pins viewed from the direction A in FIG. 1, partly in section.

FIG. 4 shows a view from Direction A in FIG. 1 of a part of a two-point contact for the load suspension.

The beam 1 rests with its supporting knife-edge 2 on a bearing stone 4 which is mounted on a balance frame 6. The balance frame 6 may form part of a housing for the assembly. By means of load-support knife-edge 8 thereof the beam 1 carries a socket 10 of a load suspension member 12. A suspension stirrup 14 carries a weight basket 16 and loading pan 18 at its lower end. A plate 20, through which two pointed screws 22 are screwed, is fixed on the top end of the suspension stirrup 14, the lower ends of the screws 22 resting on the suspension member 12.

The beam 1 has a counterweight 24 and is projected scale 26. For arresting the pivotal or oscillatory motion of the beam 1, two sockets 28 are located on the beam near the supporting knife-edge 2. The sockets 28 are spaced apart ajdacent opposite sides of the beam 1 in a line transverse to the longitudinal axis of the beam 1. A socket 30 is also arranged on the beam, sockets 28 and 30 being located on opposite sides of counterweight 24 along the length of the beam. Points 32 and 34 are fixed relative to the frame 6 of the balance to cooperate with the sockets 28 and 30 respectively. When the loading is removed from the knife-edge 8 of the beam, the beam first tilts round its supporting knife-edge 2 until the sockets 28 rest on the points 32. Then the beam tilts round a further axis formed by the points 32, whereupon the supporting knife-edge 2 is lifted from the bearing stone 4 until the socket 30 rests on the point 34.

For lifting the suspension member 12 off the load knife-edge 8 after weighing has been completed, a parallelogram support is provided which has two guide rods 36 and 38, the left-hand ends of which, as viewed in FIG. 2, are bifurcated. Two pointed screws 40 are fastened on arm 6a of the balance frame 6, one screw being spaced from either side of beam 1, and the screws being located on a line transverse to the longitudinal axis of the beam. The guide rod 38 is provided in its bottom surface with depressions which correspond to the pointed screws 40, and guide rod 38 pivotally rests thereon. The bottom surface of guide rod 36 is provided towards its right-hand end as viewed in FIG. 2, with a depression which rests on a pointed screw 42 fastened on arm 6b of frame 6. Between the left-hand (as viewed in FIG. 2) bifurcated ends of the two guide rods, a stop carrier is provided in the form of a plate 44. Two pointed screws 46 and 48 project from each end of the stop carrier 44, one upwards and one downwards, both being of equal length, the screws 46 and 48 engaging in corresponding depressions in the two guide rods (36,38). The stop carrier 44 is thus supported between the guide rods which press on the pointed screws 46,48 from above and below respectively. The stop carrier 44 carries three lifting pins 50, which project upwardly from the carrier between the arms of the bifurcated end of guide rod 36, the free ends of the pins 50 being pointed and suitably dimensioned to be able to engage in sockets 52 of the suspension member 12.

A spring 54 is fixed on the guide rod 36 and passes through the opening 56 between the arms of the bifurcated end of guide rod 38, the lower end of the spring being fixed on the arm 6a. By virtue of spring 54 the guide rod 36 is pressed from above against the points of the screws 42 and 46. The guide rod 38 is extended on the right (as viewed in FIGS. 1 and 2) beyond its points of contact with the screws 40 by an arm 58, which arm engages via a flexible coupling 60 with a draw rod 62 serving to actuate the weighing stopping device. The guide rod 38 is pressed upwards against the pointed screws 48 and downwards against the pointed screws 40 by a downwardly directed pull of the draw rod 62.

If, in the position of the parts shown in the drawings, the draw rod 62 is moved downwards, the lifting pins 50 are moved upwards by the parallelogram support, the pins moving in arcs having radii that are equal to the effective lengths of the guide rods 36 and 38, namely equal to the distance in the direction of the beam between the points of the screws 46 and 42, and 48 and 40 respectively. The location of pins 40 and 42 and the dimensions of the guide rods are, however, chosen so that this distance is equal to the distance between the knife-edge lines of the loading knife-edge 8 and the supporting knife-edge 2. Thus, while the points of the lifting pins 50 carry out arcuate movements, the lifting pins retain their vertical position, so that no torsional moment is exerted on the suspension member 12. Owing to this, it now becomes possible, in the case of a true arcuate weighing stopping device, to provide a three-point contact for the suspension member; in this embodiment through the three lifting pins 50. Also, this construction means that the two pointed screws 22 of the suspension stirrup 14 are always equally loaded with all weighing stopping and starting operations.

Instead of a three-point contact, a two-point contact may also be provided according to FIG. 4. Here only two lifting pins 50' are provided, each pin having considerably rounded off peaks 66, with which they frictionally engage in the conical depressions of the sockets 52.

I claim:

1. In combination, a weighing balance comprising an unsymmetrical beam, a frame having a bearing surface, a beam-supporting knife edge located on said beam and engaging said bearing surface, a load-supporting knife edge carried by said beam at a spaced distance from said beam-supporting knife edge, a load suspension member supportable by said load-supporting knife edge during a weighing operation, said load suspension member being liftable from said load-supporting knife edge to stop the weighing operation, counterweight means carried by said beam, said beam, in condition when said load suspension member is lifted from said load-supporting knife edge, being tiltable under action of said counterweight to a stop position wherein said beam-supporting knife edge is raised from said bearing surface, and means for arcuately stopping the weighing operation by lifting said load suspension member from said load-supporting knife edge and for arcuately starting the weighing operation by permitting said load suspension member to be supported by said load-supporting knife edge, said arcuate stopping and starting means comprising a parallelogram support formed by two parallel guide members, lifting means mounted at one end of said guide member and engageable with said load suspension member, said guide members having another end thereof mounted on said frame, each of said guide members having an effective length approximately equal to the distance between said beam-supporting and said load-supporting knife edges, said guide members of said parallelogram support maintaining parallelism with an imaginary line extending between said knife edges in condition when said lifting pins engage said load suspension member and said guide members tilt with said beam.

2. A weighing balance according to claim 1, wherein said guide members and said beam having longitudinal median axes lying in a common plane.

3. A weighing balance according to claim 1, wherein said guide members are mounted on bearing points carried by said frame, and said lifting pins are supported on bearing points carried by said guide members, said bearing points being disposed vertically below said knife edges respectively.

4. A weighing balance according to claim 1, including a suspension stirrup for supporting a load, said suspension stirrup engaging said suspension member by means of a two point contact, and substantially conical depressions being provided on said suspension member, said lifting pins having rounded off tips engaging in said substantially conical depressions.

* * * * *